US011231643B2

United States Patent
Otani

(10) Patent No.: US 11,231,643 B2
(45) Date of Patent: Jan. 25, 2022

(54) DIRECTIONAL LENS HAVING LENS ARRAY

(71) Applicant: SEIKO EPSON CORPORATION, Tokyo (JP)

(72) Inventor: Makoto Otani, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/550,464

(22) Filed: Aug. 26, 2019

(65) Prior Publication Data

US 2020/0064723 A1 Feb. 27, 2020

(30) Foreign Application Priority Data

Aug. 27, 2018 (JP) .............................. JP2018-158074

(51) Int. Cl.
  *G02B 27/09* (2006.01)
  *G03B 21/20* (2006.01)

(52) U.S. Cl.
  CPC ....... *G03B 21/208* (2013.01); *G02B 27/0961* (2013.01); *G03B 21/20* (2013.01); *G03B 21/2013* (2013.01); *G03B 21/2033* (2013.01)

(58) Field of Classification Search
  CPC .. G03B 21/208; G03B 21/2033; G03B 21/20; G03B 21/2013; G03B 21/204; G02B 27/0961; G02B 27/0966; H04N 9/3194; H04N 9/3152; H04N 9/3155; H04N 9/3161; H04N 9/6164
  See application file for complete search history.

(56) References Cited

U.S. PATENT DOCUMENTS

| | | | | |
|---|---|---|---|---|
| 6,959,870 B2* | 11/2005 | Tsikos | .................... | B82Y 15/00 235/462.1 |
| 7,070,107 B2* | 7/2006 | Tsikos | .................... | B82Y 15/00 235/462.01 |
| 7,086,594 B2* | 8/2006 | Tsikos | .................... | B82Y 15/00 235/454 |
| 7,104,455 B2* | 9/2006 | Tsikos | .................... | B82Y 15/00 235/462.22 |
| 7,152,795 B2* | 12/2006 | Tsikos | .................... | B82Y 15/00 235/462.01 |
| 7,559,671 B2* | 7/2009 | Lee | .................... | G02B 27/0994 353/98 |
| 7,600,689 B2* | 10/2009 | Tsikos | .................... | B82Y 15/00 235/462.01 |

(Continued)

FOREIGN PATENT DOCUMENTS

JP 2015-111385 A 6/2015

*Primary Examiner* — Bao-Luan Q Le
(74) *Attorney, Agent, or Firm* — Dority & Manning, P.A.

(57) ABSTRACT

A light emitting device is provided with a first light emitter and a second light emitter. The first light emitter is provided with a first lens for making the light of the first light source wide-angle, and the second light emitter is provided with a second lens for making the light of the second light source wide-angle. A plurality of first small lenses are arranged on a first incident plane of the first lens. The first small lens has a shape in which a maximum value of an angle formed between the first incident plane and a tangent of the first small lens is larger than an angle formed between the first incident plane and first light. The second lens has substantially the same configuration.

17 Claims, 11 Drawing Sheets

(56) References Cited

U.S. PATENT DOCUMENTS

| | | | |
|---|---|---|---|
| 8,416,500 B2* | 4/2013 | Mitra | G02B 27/0905 359/619 |
| 9,939,561 B2* | 4/2018 | Miyasaka | G02B 5/02 |
| 10,203,590 B2* | 2/2019 | Sakata | G03B 21/208 |
| 10,599,024 B2* | 3/2020 | Inoko | G03B 21/28 |
| 2002/0195496 A1* | 12/2002 | Tsikos | G02B 19/009 235/462.01 |
| 2003/0146282 A1* | 8/2003 | Tsikos | G02B 26/105 235/454 |
| 2003/0150916 A1* | 8/2003 | Tsikos | G02B 19/0028 235/454 |
| 2003/0150917 A1* | 8/2003 | Tsikos | G02B 19/009 235/454 |
| 2003/0189098 A1* | 10/2003 | Tsikos | G02B 19/0028 235/454 |
| 2008/0156882 A1* | 7/2008 | Tsikos | G02B 26/105 235/462.43 |
| 2008/0247164 A1* | 10/2008 | Lee | G02B 27/0994 362/241 |
| 2011/0157706 A1* | 6/2011 | Mitra | G02B 27/0905 359/619 |
| 2014/0118702 A1* | 5/2014 | Taniguchi | G03B 21/2033 353/38 |
| 2015/0116216 A1 | 4/2015 | Sakai et al. | |
| 2015/0192848 A1* | 7/2015 | Okuno | F21V 7/00 348/759 |
| 2015/0293271 A1* | 10/2015 | Miyasaka | G02B 5/0278 353/38 |
| 2015/0301438 A1* | 10/2015 | Akiyama | G03B 21/2033 353/20 |
| 2018/0088255 A1* | 3/2018 | Sakai | G02B 3/0006 |
| 2018/0180976 A1* | 6/2018 | Inoko | G03B 21/2013 |
| 2018/0210328 A1* | 7/2018 | Uehara | G02B 27/0961 |
| 2018/0210329 A1* | 7/2018 | Sakata | F21V 13/04 |
| 2018/0239229 A1* | 8/2018 | Shimizu | G03B 21/2013 |
| 2020/0169707 A1* | 5/2020 | Mochizuki | G02B 27/42 |

\* cited by examiner

DIRECTIONAL LENS HAVING LENS ARRAY

The present application is based on, and claims priority from JP Application Serial Number 2018-158074, filed Aug. 27, 2018, the disclosure of which is hereby incorporated by reference herein in its entirety.

BACKGROUND

1. Technical Field

The present disclosure relates to an lens, a light emitting device equipped with the lens, and an image display system equipped with the light emitting system.

2. Related Art

In JP-A-2015-111385 (Document 1), there is disclosed an image display system which detects the position of a pointing body such as a pen or a finger operated on a display surface such as a screen on which an image is displayed, and performs display or an operation corresponding to a trajectory of the pointing body. The image display system in Document 1 is provided with a projector and a light emitting device for emitting light along a projection surface (a display surface) on which the projector performs the projection, and creates a light curtain which covers the projection surface with the light emitted from the light emitting device. The projector detects the position of the pointing body based on reflection of the light by the pointing body operated on the projection surface, and then performs the projection based on the detection result.

The light emitting device in Document 1 is provided with a light emitter and a housing. The light emitter is provided with a light source, a collimator as a lens for substantially collimating the light emitted from the light source, and a directional lens for widening the angle of the light in a direction (a first direction) along the projection surface out of the light substantially collimated by the collimator. In Document 1, a Powell lens is used as the directional lens. The Powell lens has a convex shape on the light incidence side and a flat shape on the light exit side when viewed from a second direction perpendicular to the first direction, and has a rectangular shape when viewed from the first direction.

When using a single Powell lens as the directional lens, eccentricity in the intensity distribution of the light in a direction along the projection surface becomes remarkable when misalignment between the Powell lens and the light source occurs. Therefore, it has been proposed to shape a incident plane of the directional lens into a shape of small lenses each having a convex surface arranged in an array. By arranging the small lenses in an array, the light made wide-angle by respective small lenses is superimposed with each other. Therefore, even when the positional accuracy between the Powell lens and the light source is reduced, it is possible to suppress the eccentricity in the intensity distribution of the light in a direction along the projection surface.

However, in the lens having the small lenses arranged in an array, a round corner occurs in a junction between the small lenses constituting the array. In the lens having the small lenses arranged in an array, it is difficult to eliminate the round corner in the junction between the small lenses in view of the manufacturing. There is a problem that diffraction noise caused by the array formation is amplified when light enters the part where the round corner has occurred.

SUMMARY

An advantage of the present disclosure is to suppress the diffraction noise caused by the light entering the round corner having occurred in the junction between the small lenses when using the lens having the small lenses arranged in an array.

A light emitting device according to an aspect of the present disclosure includes a first light source, a first collimator configured to substantially collimate light emitted from the first light source with respect to a first optical axis, a first lens including a first incident plane provided with a plurality of first small lenses configured to make first light emitted from the first collimator wide-angle with respect to a first direction different from the first optical axis, a second light source, a second collimator configured to substantially collimate light emitted from the second light source with respect to a second optical axis, and a second lens including a second incident plane provided with a plurality of second small lenses configured to make second light emitted from the second collimator wide-angle with respect to a direction different from the second optical axis and same as the first direction, wherein the first small lens has a shape in which a maximum value of an angle formed between the first incident plane and a tangent of the first small lens is larger than an angle formed between the first incident plane and the first light, and the second small lens has a shape in which a maximum value of an angle formed between the second incident plane and a tangent of the second small lens is larger than an angle formed between the second incident plane and the second light.

In this aspect of the present disclosure, the first small lens may have a shape in which the angle formed between the first incident plane and the tangent of the first small lens is larger than the angle formed between the first incident plane and the first light in an area at a junction side between the first small lenses with respect to a tangent point with the tangent of the first small lens extending in a same direction as a direction of the first light.

In this aspect of the present disclosure, the second small lens may have a shape in which the angle formed between the second incident plane and the tangent of the second small lens is larger than the angle formed between the second incident plane and the second light in an area at a junction side between the second small lenses with respect to a tangent point with the tangent of the second small lens extending in a same direction as a direction of the second light.

In this aspect of the present disclosure, the first small lens may be a Powell lens.

In this aspect of the present disclosure, the second small lens may be a Powell lens.

In this aspect of the present disclosure, the plurality of first small lenses provided to the first lens may include the first small lenses of a plurality of sizes.

In this aspect of the present disclosure, the plurality of second small lenses provided to the second lens may include the second small lenses of a plurality of sizes.

The above light emitting device may further include a cover lens having a curved surface shape and disposed downstream of the lens.

In this aspect of the present disclosure, the cover lens may rotate around a rotational axis line substantially parallel to the first direction.

An image display system according to another aspect of the present disclosure includes anyone of the light emitting devices described above, a imager configured to detect a reflection position of light emitted from the light emitting device, and a projection device configured to project an image corresponding to a detection result detected by the imager.

A lens according to another aspect of the present disclosure includes a incident plane provided with a plurality of small lenses configured to make first light, which was substantially collimated by a collimator with respect to an optical axis, wide-angle with respect to a first direction different from the optical axis, wherein the small lens has a shape in which a maximum value of an angle formed between the incident plane and a tangent of the small lens is larger than an angle formed between the incident plane and the first light.

In this aspect of the present disclosure, the small lens may be a Powell lens.

DESCRIPTION OF AN EXEMPLARY EMBODIMENT

Figure 1:
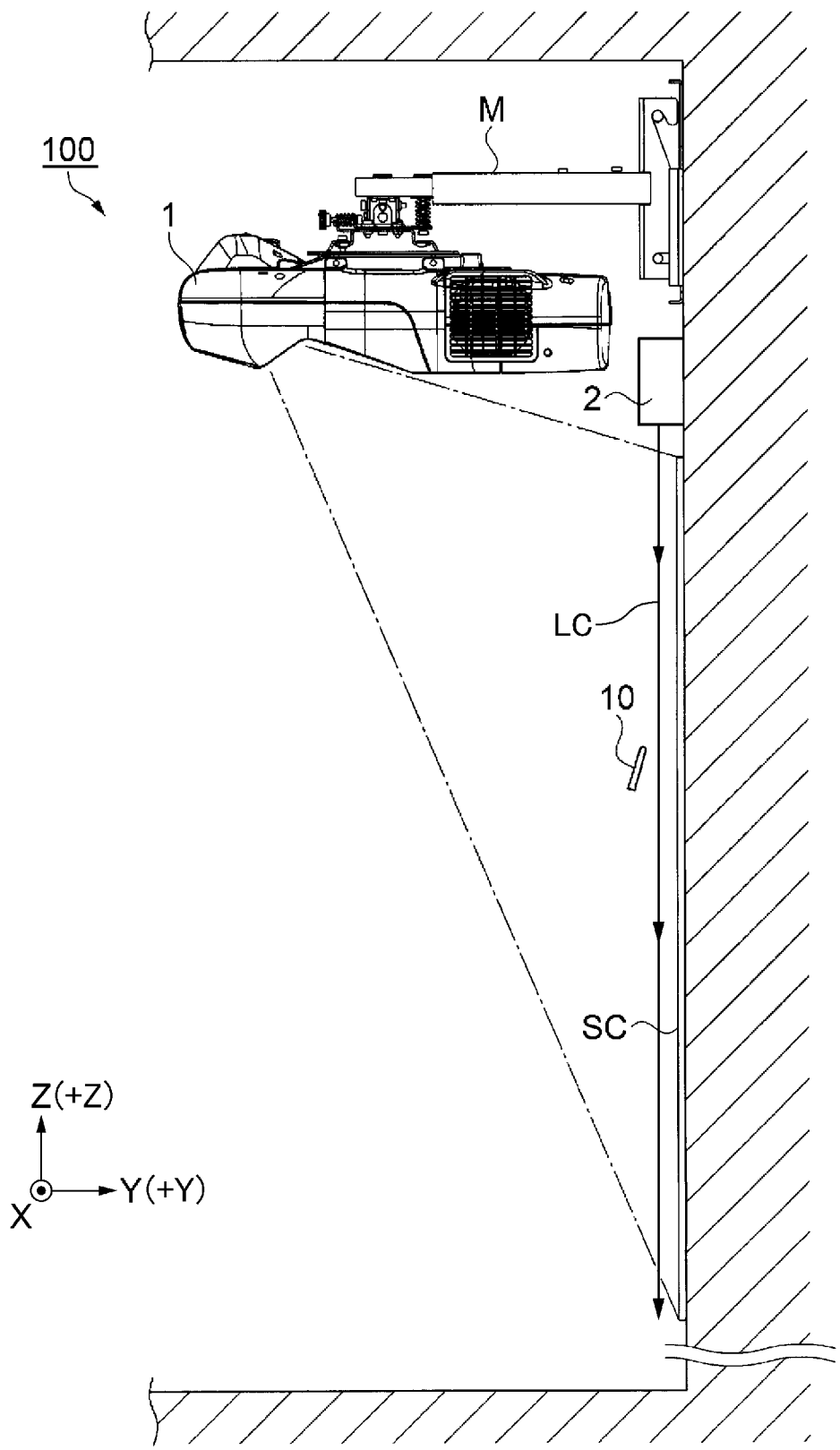
FIG. 1 is a schematic diagram showing a schematic configuration of an image display system according to an embodiment.

An embodiment of the present disclosure will hereinafter be described with reference to the accompanying drawings. It should be noted that in the drawings described hereinafter, the dimensions and the ratios of the constituents are appropriately made different from actual ones in order to show the constituents with sizes with which the constituents can be recognized in the drawings.

Configuration of Image Display System

FIG. 1 is a schematic diagram showing a schematic configuration of an image display system 100 according to the present embodiment. As shown in FIG. 1, the image display system 100 is provided with a projector 1 and a light emitting device 2. As shown in FIG. 1, the projector 1 is supported by a support device M installed on a wall surface above a projection surface SC such as a screen or a whiteboard, and projects an image on the projection surface SC from a side facing downward. Although described later in detail, as shown in FIG. 1, the light emitting device 2 is installed above the projection surface SC, and emits the light along the projection surface SC to create a light curtain LC.

It should be noted that in the present specification, the normal direction to the projection surface SC is defined as a front-back direction Y, and a direction toward the projection surface SC is defined as a front direction (+Y direction) as shown in FIG. 1 for the sake of convenience of explanation. Further, a vertical direction (a gravitational direction) is defined as a Z direction, and a gravity-defying direction is defined as an upper side (+Z direction). Further, a direction perpendicular to the front-back direction Y and the vertical direction Z is defined as right-left direction X, and the right side when facing to the projection surface SC is defined as a +X direction. The projection surface SC is a surface parallel to an X-Z plane.

Figure 2:
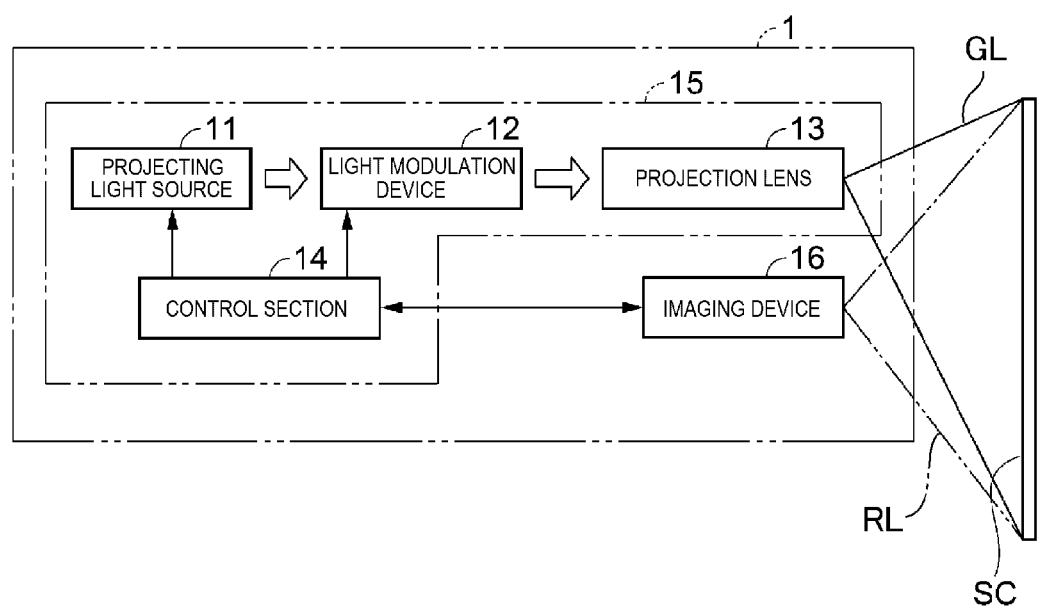
FIG. 2 is a block diagram showing a schematic configuration of a projector.

FIG. 2 is a block diagram showing a schematic configuration of the projector 1. As shown in FIG. 2, the projector 1 is provided with a projection device 15 and an imager 16. The projection device 15 is provided with a projecting light source 11, a light modulator 12, a projection lens 13 and a controller 14. The projection device 15 projects an image corresponding to image information input, or an image corresponding to a detection result detected by the imager 16 from the projection lens 13 as image light GL.

The projection device 15 modulates the light emitted from the projecting light source 11 using the light modulator 12 in accordance with the image information, and then projects the light thus modulated from the projection lens 13 on the projection surface SC. It should be noted that as the projecting light source 11, there can be used those of a discharge type, and a solid-state light source such as a light emitting diode or a laser. Further, as the light modulator 12, there can be used a device using a liquid crystal panel, a micromirror type device such as a device using a DMD and so on.

The controller 14 is a device provided with a CPU, a ROM, a RAM and so on to function as a computer, and performs, for example, control related to projection of the image based on the information output from the imager 16 as described later in addition to control of an operation of the projector 1.

The imager 16, which is provided with imaging elements (not shown) such as CCD or CMOS, captures an image of the projection surface SC as an image capturing target, and then outputs information obtained by image capturing to the controller 14. Further, the imager 16 detects reflected light RL, which is a component of the light emitted from the light emitting device 2 and then reflected by the pointing body (e.g., a pen 10 or a finger of the user), to thereby detect a position (a reflection position) of the pointing body, and then outputs the information thus detected to the controller 14.

The projector 1 analyzes the position of the pointing body on the projection surface SC based on the information output from the imager 16, and then performs, for example, projection of a superimposed image obtained by superimposing a line representing the trajectory of the pointing body on the image information, and a change in the image to be projected based on the analysis result. Due to the above, it is possible to perform interactive image display which is the image display corresponding to an action of the user on the projection surface SC.

Configuration of Light Emitting Device

Figure 3:
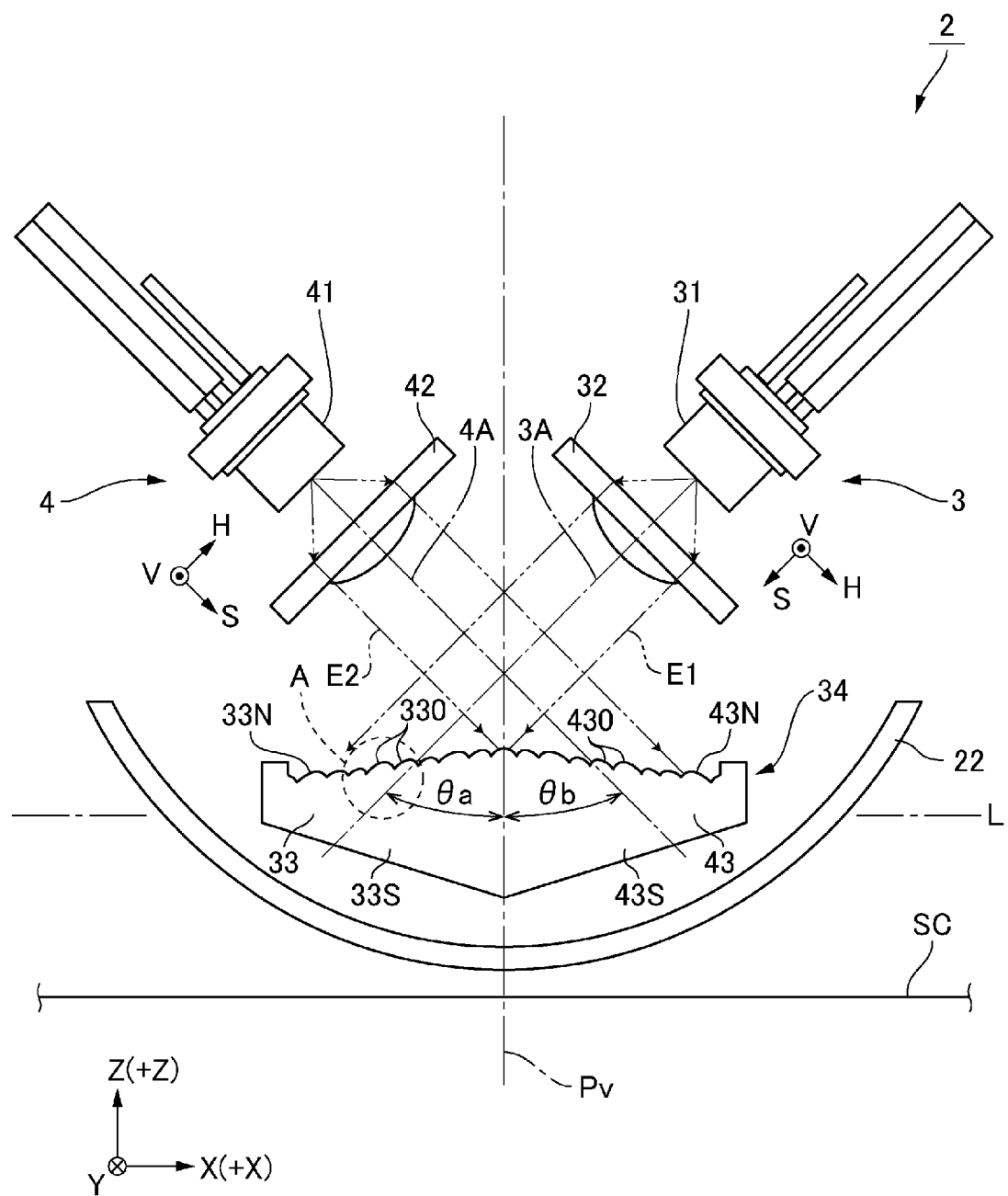
FIG. 3 is a schematic diagram showing a schematic configuration of a light emitting device according to the embodiment.

FIG. 3 is a schematic diagram showing a schematic configuration of the light emitting device 2. The light emitting device 2 is disposed above (on the +Z direction side of) the projection surface SC, and at substantially the center of the projection surface SC in the right-left direction X. The light emitting device 2 emits the light along the projection surface SC. The light emitting device 2 is provided with a device main body and a cover lens 22. The device main body 21 is provided with a first light emitter 3, a second light emitter 4 and a housing for housing these sections inside.

As shown in FIG. 1, the light emitting device 2 is installed so as to protrude backward from a wall surface above the projection surface SC. Therefore, the first light emitter 3 and the second light emitter 4 each emit the light downward from an emission position posterior to the projection surface SC.

The cover lens 22 has a curved surface shape convex downward. The cover lens 22 has a circular arc shape or an elliptical arc shape when viewed from the front-back direction Y, and is arranged symmetrically about a virtual center plane Pv described later. Further, the cover lens 22 extends in the front-back direction Y, and has a rectangular shape when viewed from the vertical direction Z. The cover lens 22 is supported so as to be able to rotate around a first axis L as a rotational axis line substantially parallel to the right-left direction X. Thus, when a misalignment between an installation angle of the device main body 21 and an installation angle of the cover lens 22 occurs, it is possible to resolve the misalignment by rotating the cover lens 22. Alternatively, when using the cover lens 22 having a shape with which an incident direction of the light to the cover lens 22 from each of the first light emitter 3 and the second light emitter 4 is changed by rotating the cover lens 22, it is also possible to change the shape of the light curtain LC by an angle adjustment of the cover lens 22.

As shown in FIG. 3, the first light emitter 3 and the second light emitter 4 are arranged in the right-left direction X, and emit the light centered on respective directions different from each other. When a plane which is along the Y-Z plane and perpendicular to the projection surface SC, and extending in the vertical direction Z between the first light emitter 3 and the second light emitter 4 is defined as the virtual center plane Pv, the first light emitter 3 and the second light emitter 4 are configured symmetrically with reference to the virtual center plane Pv. The first light emitter 3 is provided with a first light source 31, a first collimator 32 and a first lens 33. The first collimator 32 and the first lens 33 are disposed on a first optical axis 3A as an optical axis of the first light source 31, and emit the light obliquely downward left.

Similarly to the first light emitter 3, the second light emitter 4 is provided with a second light source 41, a second collimator 42 and a second lens 43, and has a second light path extending from the second light source 41 to the second lens 43. The second collimator 42 and the second lens 43 are disposed on a second optical axis 4A as an optical axis of the second light source 41, and emit the light around a direction obliquely downward right.

In the light emitting device 2, the first optical axis 3A and the second optical axis 4A cross each other in an anterior stage of the light path of each of the first lens 33 and the second lens 43 when viewed from the front-back direction Y. Specifically, the first optical axis 3A and the second optical axis 4A cross each other between the first collimator 32 and the first lens 33 and between the second collimator 42 and the second lens 43. In other words, in the light emitting device 2, there is adopted a configuration in which the light emitted from the first light emitter 3 and the light emitted from the second light emitter 4 partially overlap each other.

The first light source 31 and the second light source 41 are each a laser source for emitting the light having the peak light intensity at a wavelength of about 940 nm, and each have, for example, an active layer as a light emitter and cladding layers stacked on both sides of the active layer. As the first light source 31 and the second light source 41, there is used a laser source of a type such as a multimode oscillation type in which the light distribution characteristic is different between a width direction H and a stacking direction V, wherein the width direction H is parallel to the active layer, the stacking direction V is perpendicular to the width direction H, and the active layer and the cladding layers are stacked in the stacking direction V. The light from the first light source 31 and the light from the second light source 41 are each emitted in an S direction perpendicular to the width direction H and the stacking direction V. In other words, the S direction is the direction along each of the first optical axis 3A and the second optical axis 4A. In the present embodiment, the width direction H and the S direction are set to the directions along the projection surface SC shown in FIG. 1. In other words, the width direction H and the S direction are made parallel to the X-Z plane.

The first collimator 32 substantially collimates the light emitted from the first light source 31. Similarly, the second collimator 42 substantially collimates the light emitted from the second light source 41. For example, the first collimator 32 makes component light, which is emitted from a point on the first optical axis 3A and spreads at an angle with the first optical axis 3A, proceed so as to substantially be parallel to the first optical axis 3A. Similarly, the second collimator 42 makes component light, which is emitted from a point on the second optical axis 4A and spreads at an angle with the second optical axis 4A, proceed so as to substantially be parallel to the second optical axis 4A.

The first lens 33 and the second lens 43 are provided in a single lens body 34. The lens body 34 is formed of a material such as synthetic resin high in refractive index, and has a rectangular shape when viewed from the vertical direction Z. As shown in FIG. 3, the lens body 34 has a symmetrical shape with reference to the virtual center plane Pv, wherein the first lens 33 is located on the left side (the −X direction side) and the second lens 43 is located on the right side (the +X direction side). When a plane (a plane along the Y-Z plane) perpendicular to the projection surface SC and extending in the vertical direction Z between the first light emitter 3 and the second light emitter 4 is defined as the virtual center plane Pv, the lens body 34 is disposed symmetrically about the virtual center plane Pv.

The first lens 33 is tilted toward a direction in which the distance from the first collimator 32 increases as the distance from the virtual center plane Pv increases. The first lens 33 is provided with a first incident plane 33N having a plurality of first small lenses 330 arranged on a side (a light incident side) opposed to the first collimator 32, and a first plane 33S disposed on a light exit side. Each of the first small lenses 330 is a Powell lens, and has a convex shape on the first collimator 32 side. On the first incident plane 33N, each of the first small lenses 330 extends in the stacking direction V, and the plurality of first small lenses 330 are arranged in a direction perpendicular to the stacking direction V. The plurality of first small lenses 330 are arranged in the width direction H on the first incident plane 33N, and arranged in a direction in which the distance from the first collimator 32 increases as the distance from the virtual center plane Pv increases.

The first lens 33 makes first light E1 emitted from the first collimator 32 wide-angle in the width direction H while keeping the direction of the first light E1 having been collimated by the first collimator 32 in the stacking direction V, and then emits the first light E1 around the first optical axis 3A. In other words, the first lens 33 makes the first light E1 entering the first lens 33 wide-angle only in the direction corresponding to the width direction H out of the directions perpendicular to the first optical axis 3A. On this occasion, the plurality of first small lenses 330 provided in the first lens 33 are formed so that the light made wide-angle by one of the first small lenses 330 and the light made wide-angle by adjacent one of the first small lenses 330 in the width direction H are superimposed with each other.

The second lens 43 is configured so as to be symmetrical to the first lens 33 about the virtual center plane Pv. Specifically, the second lens 43 is provided with a second incident plane 43N having a plurality of second small lenses 430 arranged on a side (a light incidence side) opposed to the second collimator 42, and a second plane 43S disposed on a light exit side. Each of the second small lenses 430 is a Powell lens. The second lens 43 makes second light E2 emitted from the second collimator 42 wide-angle only in a direction corresponding to the width direction H out of the directions perpendicular to the second optical axis 4A. On this occasion, the plurality of second small lenses 430 provided to the second lens 43 are formed so that the light made wide-angle by one of the second small lenses 430 and the light made wide-angle by adjacent one of the second small lenses 430 in the width direction H are superimposed with each other.

As shown in FIG. 3, the light emitting device 2 is arranged so that the width direction H of the light emitted from each of the first lens 33 and the second lens 43 becomes a direction along the projection surface SC. In other words, the first light emitter 3 and the second light emitter 4 are arranged so that the light made wide-angle in each of the first lens 33 and the second lens 43 is made wide-angle in a direction parallel to the right-left direction X of the projection surface SC. In other words, the light emitting device 2 makes the first light E1 and the second light E2 emitted respectively form the first collimator 32 and the second collimator 42 wide-angle in the right-left direction X which is a first direction different from both of the first optical axis 3A and the second optical axis 4A.

Further, as shown in FIG. 3, in the light emitting device 2, the first light emitter 3 and the second light emitter 4 are tilted in respective directions different from each other with respect to the virtual center plane Pv, and a part of the light emitted by the first light emitter 3 and a part of the light emitted by the second light emitter 4 overlap each other at the position of the virtual center plane Pv. Specifically, when viewed from the −Y direction, the first light axis 3A is tilted in a clockwise direction with respect to the virtual center plane Pv, and the second optical axis 4A is tilted in a counterclockwise direction with respect to the virtual center plane Pv. A tilt angle θa of the first optical axis 3A with respect to the virtual center plane Pv and a tilt angle θb of the second optical axis 4A are the same (θa=θb), and thus, the first light emitter 3 and the second light emitter 4 are arranged so as to be substantially symmetrical to each other about the virtual center plane Pv. Thus, the light emitting device 2 emits the light in an area along the entire area of the projection surface SC to create the light curtain LC covering the entire area of the projection surface SC.

The tilt angles θa, θb are set to angles corresponding to the aspect ratio of the projection surface SC. For example, the light emitting device 2 is configured so as to efficiently emit the light along the projection surface SC which is a landscape surface with the aspect ratio of 2:1. Specifically, in order to provide the highest intensity to the light proceeding toward right and left end parts of a lower hem of the projection surface SC which are the farthest position from the light emitting device 2, the tilt angles θa, θb are set so that the first optical axis 3A extends toward the left end part of the lower hem of the projection surface SC, and the second optical axis 4A extends toward the right end part of the lower hem of the projection surface SC. When the aspect ratio is 2:1, the tilt angles θa, θb are set to 45°. It should be noted that the aspect ratio of the projection surface is not limited to 2:1, but can also be other values. For example, 16:10 can also be adopted.

Since in the light emitting device 2, the light path of the first light emitter 3 and the light path of the second light emitter 4 cross each other, the light emitted by the first light emitter 3 and the light emitted by the second light emitter 4 overlap at a position near the light emitting device 2 as shown in FIG. 3. In other words, it becomes possible for the light emitting device 2 to emit the light sufficient in light intensity in an area adjacent to the light emitting device 2. Thus, even when the light emitting device 2 is disposed near the projection surface SC, the light emitting device 2 emits the light sufficient to detect the pointing body also in an area in the vicinity of the light emitting device 2 in the projection surface SC.

Figure 4:
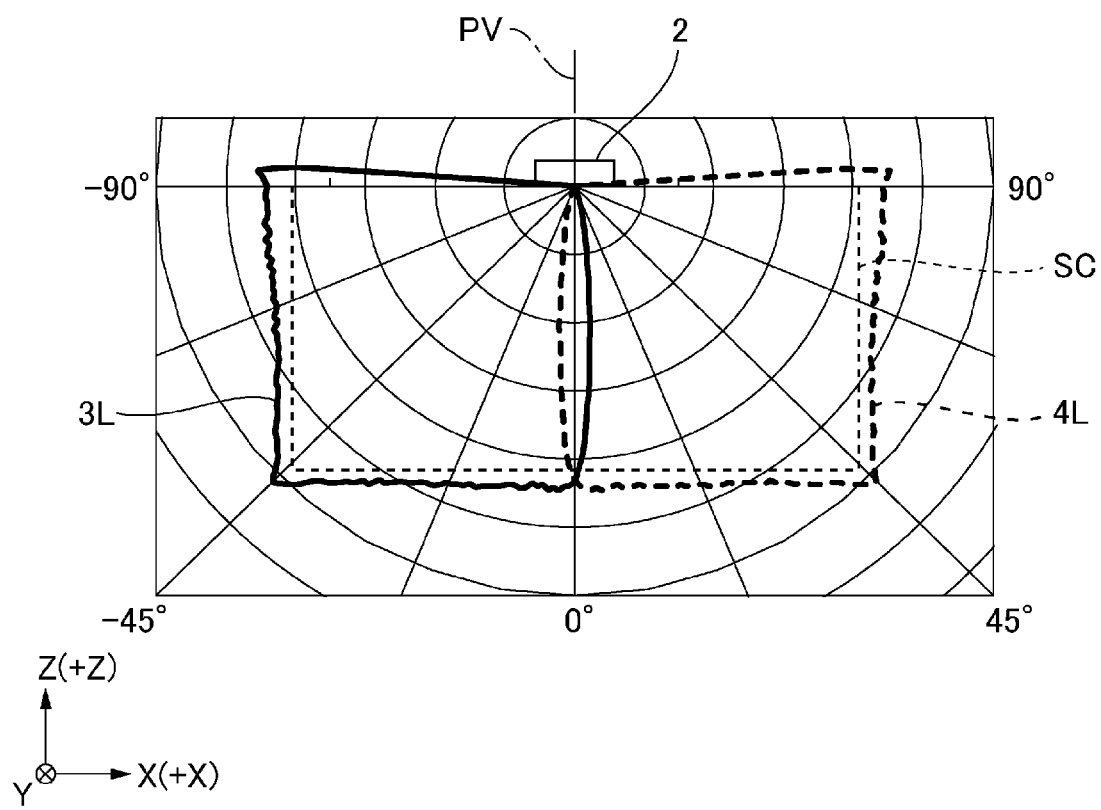
FIG. 4 is a diagram showing an intensity distribution in an area along the projection surface of the light emitted from the light emitting device.

FIG. 4 is a diagram showing an intensity distribution in an area along the projection surface SC of the light emitted from the light emitting device 2. Specifically, FIG. 4 is a diagram showing the intensity distribution 3L of the light (first emitted light) emitted from the first light emitter 3, and the intensity distribution 4L of the light (second emitted light) emitted from the second light emitter 4. It should be noted that since the distance between the virtual center plane Pv and a region for emitting the light of each of the first light emitter 3 and the second light emitter 4 is remarkably small compared to the size of the projection surface SC, in the description of the intensity distribution, there is adopted an approximation of assuming that the region for emitting the light of each of the first light emitter 3 and the second light emitter 4 is located on the virtual center plane Pv as shown in FIG. 4. The intensity distributions 3L, 4L of the light shown in FIG. 4 each show a range of the light intensity of corresponding one of the first emitted light and the second emitted light with which the pointing body can be detected.

Figure 5:
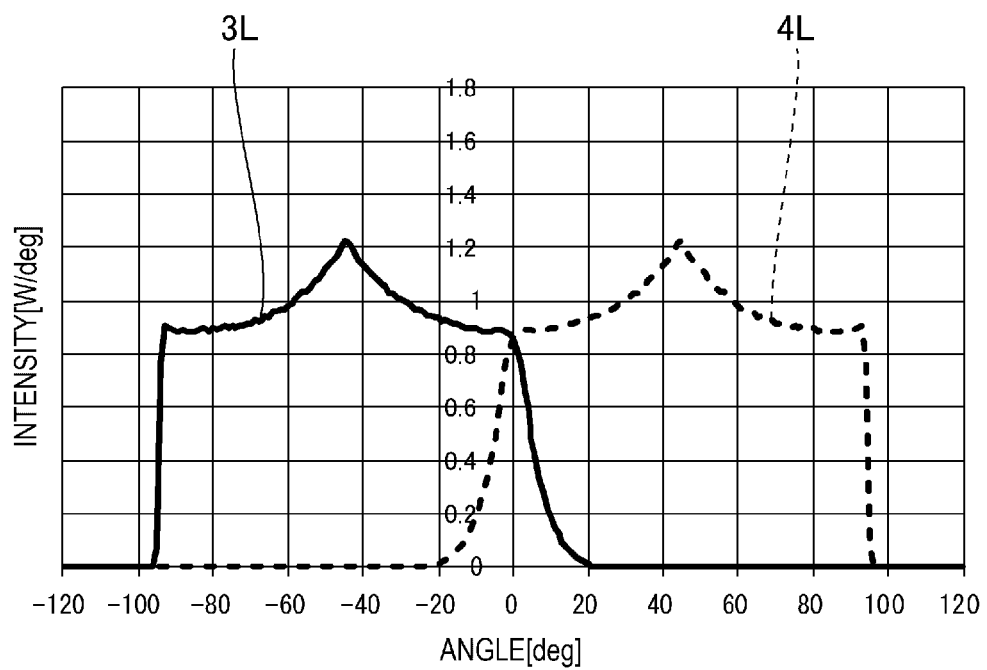
FIG. 5 is a graph showing a theoretical intensity distribution of the light emitted from the light emitting device.

FIG. 5 is a graph showing the theoretical intensity distribution of the light emitted from the light emitting device 2, and is a graph showing a relationship between an angle with respect to the virtual center plane Pv (see FIG. 3) and a relative light intensity. Specifically, FIG. 5 is a graph showing the intensity distribution 3L of the first emitted light and the intensity distribution 4L of the second emitted light.

The light emitting device 2 according to the present embodiment efficiently emits the light along the projection surface SC which is a landscape surface having a ratio between the length in the lateral direction (the X direction) and the length in the vertical direction (the Z direction) of 2:1. As show in FIG. 5, defining the angle of the tilt in the counterclockwise direction with respect to the virtual center plane Pv as a + (positive) angle, the tilt angle θa (see FIG. 3) of the first light emitter 3 is −45°, and the tilt angle θb (see FIG. 3) of the second light emitter 4 is +45°. Thus, in the intensity distribution of the light emitted from the light emitting device 2, the light proceeding toward the right and left end parts of the lower hem which are the farthest positions from the light emitting device 2 to the projection surface SC has a peak of the intensity. Specifically, in the first emitted light, the light having θa of −45°, namely the light proceeding toward the lower left end part which is the farthest position from the first light emitter 3 of the area as an irradiation target of the first light emitter 3 in the projection surface SC, becomes the highest in light intensity. Similarly, in the second emitted light, the light having θb of +45°, namely the light proceeding toward the lower right end part which is the farthest position from the second light emitter 4 of the area as an irradiation target of the second light emitter 4 in the projection surface SC, becomes the highest in light intensity. Thus, as shown in FIG. 4, the light emitted from the light emitting device 2 is emitted along the entire area of the projection surface SC with the light intensity enough for detecting the pointing body.

Shape of Small Lenses

Figure 6:
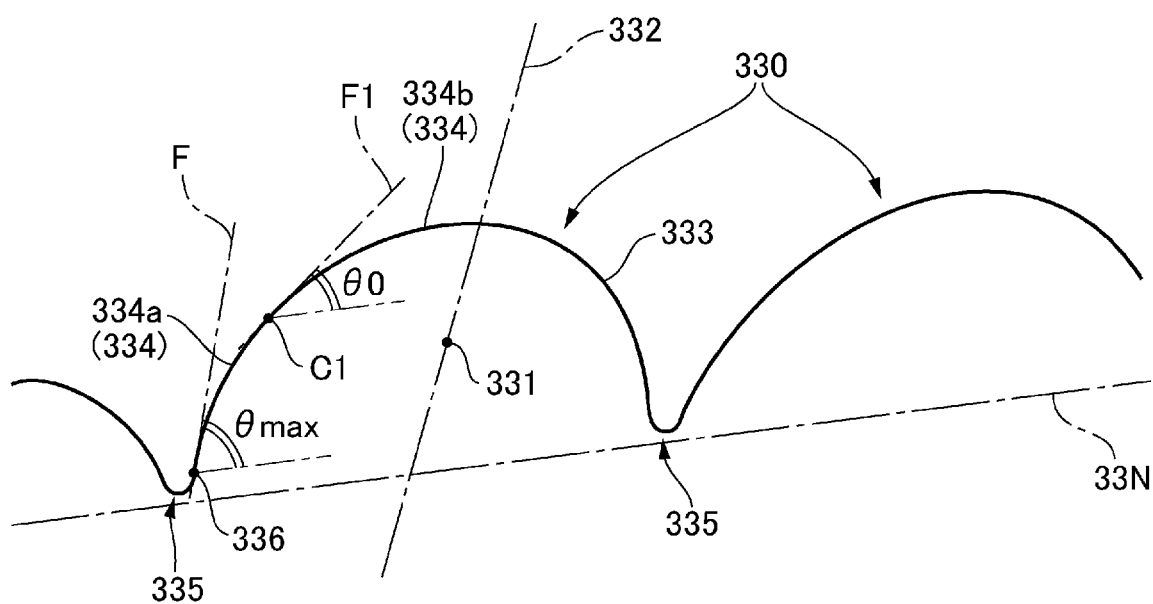
FIG. 6 is a plan view showing a part of a first lens.

FIG. 6 is a plan view showing a part of the first lens 33, and is an enlarged view of the area A shown in FIG. 3. The first lens 33 and the second lens 43 are symmetrical to each other about the virtual center plane Pv. Therefore, the shape of the first small lenses 330 provided in the first lens 33 will hereinafter be described, and the description of the shape of the second small lenses 430 will be omitted in view of the similarity.

As shown in FIG. 3, the first small lenses 330 each have a convex shape, and are arranged along the first incident plane 33N. As shown in FIG. 6, the first small lenses 330 each have an aspherical shape asymmetric about a lens center plane 332 which passes through a central axis 331 along the stacking direction V, and is perpendicular to the first plane 33S. Specifically, the first small lenses 330 each have a first surface 333 located on the virtual center plane Pv side with respect to the lens center plane 332, and a second surface 334 located on an opposite side to the first surface 333 with respect to the lens center plane 332, wherein the first surface 333 and the second surface 334 have shapes asymmetrical to each other. The shapes of the first surface 333 and the second surface 334 are each a shape in which the eccentricity in the light intensity distribution in the direction along the projection surface SC is suppressed. Further, as will be described below, the first small lenses 330 each have a shape in which the first light E1 emitted from the first collimator 32 does not enter the junction 335 between the first small lenses 330 adjacent to each other. In the present specification, the junction 335 between the first small lenses 330 adjacent to each other means a part where a round corner or a protrusion occurs in the lens shape due to the manufacturing.

In the first small lens 330, a first tangent point C1 at which a first tangent F1 extending in the same direction as the incident direction (i.e., the direction of the first optical axis 3A) of the first light E1 touches the first small lens 330 is located on the second surface 334. The second surface 334 is provided with a first area 334a and a second area 334b, wherein the first area 334a corresponds to a junction 335 side (i.e., an opposite side to a lens peak) with respect to the first tangent point C1, and the second area 334b corresponds to an opposite side (i.e., the lens peak side) to the junction 335 with respect to the first tangent point C1. The first small lenses 330 in the present embodiment each have a shape in which the angle formed between the first incident plane 33N and the tangent of the second surface 334 increases in a direction from the lens center plane 332 toward the junction 335. Therefore, there is formed a shape in which the first area 334a of the second surface 334 and the junction 335 are recessed toward the first plane 33S with respect to the first tangent F1 extending in the same direction as that of the first light E1.

Since the first small lenses 330 each have the shape in which the first area 334a of the second surface 334 and the junction 335 are recessed with respect to the first tangent F1 as described above, when the first light E1 enters the first small lens 330, the first area 334a and the junction 335 are shielded from the first light E1 by the second area 334b of the second surface 334. Therefore, there is no chance for the first light E1 to enter the first area 334a and the junction 335.

The first small lenses 330 each have a shape in which the maximum value θmax of an angle formed between the first incident plane 33N and the tangent F of the first small lens 330 is larger than an angle θ0 formed between the first incident plane 33N and the first light E1. As shown in FIG. 6, the angle θ0 formed between the first incident plane 33N and the first light E1 corresponds to an angle formed between the first incident plane 33N and the first tangent F1, and corresponds to an angle formed between the first tangent F1 and a plane which passes through the first tangent point C1 and is parallel to the first incident plane 33N. Further, as described above, the first small lenses 330 each have the shape in which the angle formed between the first incident plane 33N and the tangent increases in a direction from the lens center plane 332 toward the junction 335. Therefore, the angle formed between the first incident plane 33N and the tangent of the first small lens 330 takes the maximum value θmax when a boundary 336 between the second surface 334 and the junction 335 becomes the tangent point.

In the present embodiment, by making the maximum value θmax of the angle formed between the first incident plane 33N and the tangent F of the first small lens 330 larger than the angle θ0 formed between the first incident plane 33N and the first light E1, there is formed the shape in which the first area 334a of the first small lens 330 and the junction 335 are located at the positions recessed with respect to the first tangent F1, and thus the shape in which the first light E1 does not enter the junction 335 is realized.

It should be noted that it is sufficient for the first small lenses 330 to prevent the first light E1 from entering at least the junction 335, and in order to achieve this, it is sufficient to have the shape in which at least the junction 335 is located at the position recessed with respect to the first tangent F1.

In the first small lenses 330 in the present embodiment, the first tangent point C1, which is a tangent point with the first tangent F1 extending in the incident direction of the first light E1, is located on the second surface 334 of the first small lens 330. In such a case, the condition for preventing the first light E1 from entering the junction 335 is to set the shape of the second surface 334 so as to fulfill the relational expression of (maximum value θmax)>(angle θ0) wherein the maximum value of the angle formed between the first incident plane 33N and the tangent of the second surface 334 is defined as the maximum value θmax. It is assumed that the shape of the second surface 334 is the shape in which the angle formed between the first incident plane 33N and the tangent of the second surface 334 increases in a direction from the lens center plane 332 toward the junction 335.

Further, the first small lenses 330 in the present embodiment each have a shape in which the angle formed between the first incident plane 33N and the tangent of the first small lens 330 is larger than the angle θ0 formed between the first incident plane 33N and the first light E1 in the first area 334a which is an area at the junction 335 side with respect to the first tangent point C1. Thus, there is formed the shape in which the entire area of the first area 334a and the junction 335 is recessed with respect to the first tangent F1.

In the first lens 33, the plurality of first small lenses 330 are randomized in size, and includes a plurality of sizes of lenses. The first small lenses 330 different in size have similarity cross-sectional shapes which fulfill the condition of (maximum value θmax)>(angle θ0) irrespective of the sizes thereof. In the first light emitter 3, since the first lens 33 has the plurality of first small lenses 330 different in size, the interference pattern caused by arranging the first small lenses 330 in an array is reduced. Specifically, when the first small lenses 330 are formed to have the same size, regions where the waves reinforce each other due to the difference in phase and regions where the waves cancel out each other alternately appear with regularity in the light emitted from the respective first small lenses 330, and thus, the bright and dark fringes of light, namely the interference pattern is generated. The first lens 33 in the present embodiment makes the first small lenses 330 be randomized in size to thereby reduce the interference pattern.

On the other hand, due to the randomization in size of the plurality of first small lenses 330, there occurs a variation in light intensity, and thus, the diffraction noise is amplified. However, in the present embodiment, since there is adopted the lens shape in which the first light E1 does not enter the junction 335 between the first small lenses 330 adjacent to each other, the diffraction noise is reduced. Therefore, the first light emitter 3 emits the light having the interference pattern and the diffraction noise suppressed. Further, the second light emitter 4 emits the light having the interference pattern and the diffraction noise suppressed due to substantially the same configuration.

Simulation of Noise Reduction Effect Due to Shape of Junction

Figure 7:
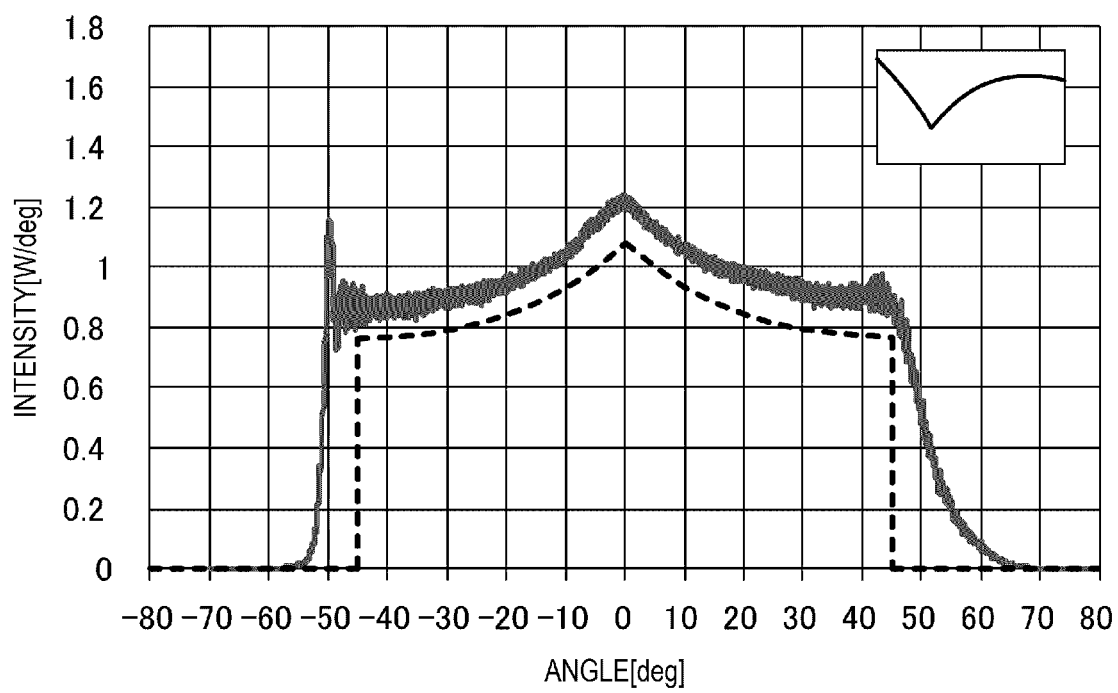
FIG. 7 is a graph showing a result of a simulation of an intensity distribution of light emitted from an lens having no round corner in a junction between small lenses.
Figure 8:
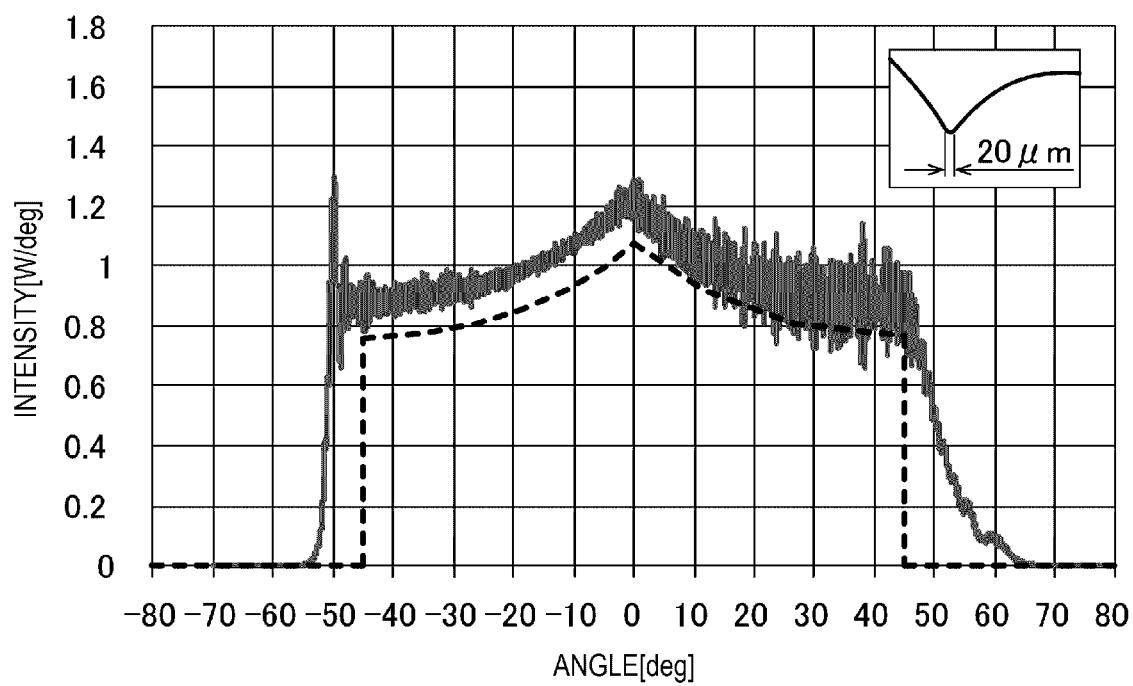
FIG. 8 is a graph showing a result of a simulation of an intensity distribution of light emitted from an lens having a round corner in a junction between small lenses.
Figure 9:
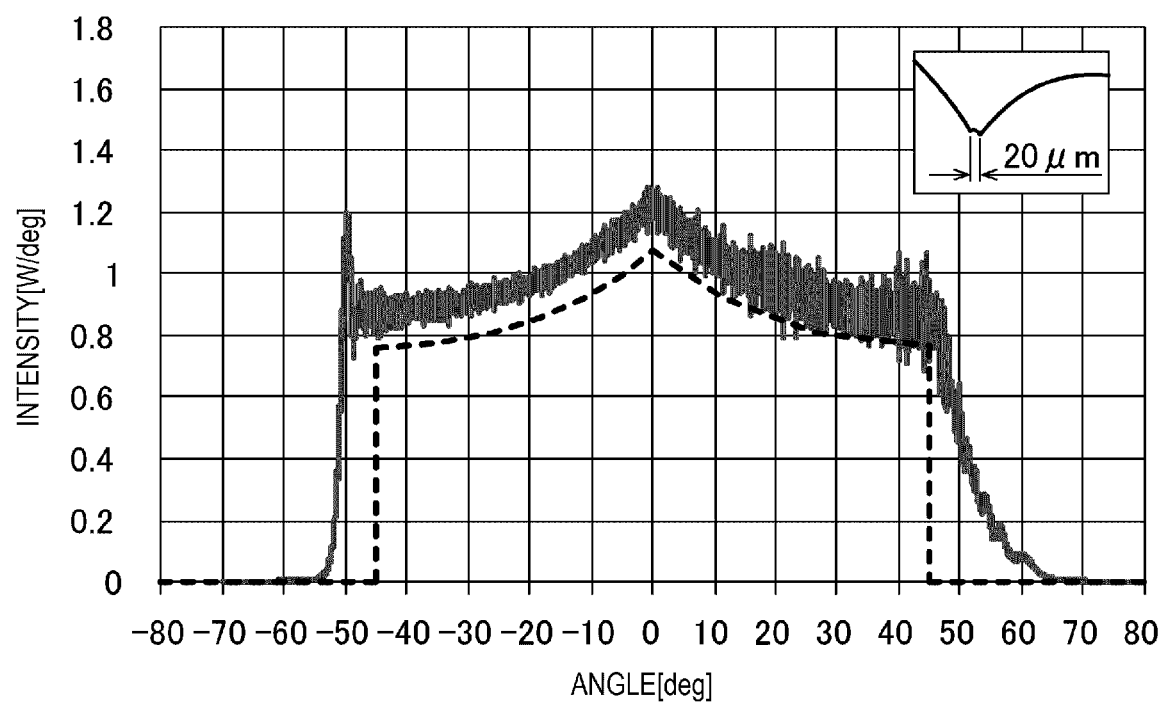
FIG. 9 is a graph showing a result of a simulation of an intensity distribution of light emitted from an lens having a protrusion in a junction between small lenses.

FIG. 7 is a graph showing a result of a simulation of an intensity distribution of light emitted from an lens having no round corner in a junction between small lenses. Further, FIG. 8 is a graph showing a result of a simulation of an intensity distribution of light emitted from an lens having a round corner in the junction between the small lenses, and FIG. 9 is a graph showing a result of a simulation of an intensity distribution of light emitted from an lens having a protrusion in the junction between the small lenses. In the simulations shown in FIG. 8 and FIG. 9, the width of the round corner and the width of the protrusion are each 20 μm. FIG. 7 through FIG. 9 are each a diagram showing a relationship between an angle with respect to the virtual center plane Pv (see FIG. 3) and the light intensity (mW/deg), wherein the dotted line represents the theoretical value of a necessary intensity, and the solid line represents the simulation result.

According to FIG. 7 through FIG. 9, both of the lens having the round corner in the junction and the lens having the protrusion in the junction are large in diffraction noise (the variation in intensity distribution), and are more than twice as large in variation in intensity distribution as the lens having no round corner. Therefore, it is seen that the diffraction noise are dramatically reduced by adopting the lens shape of preventing the light from entering the junction.

Major Functions and Advantages of Present Embodiment

As described hereinabove, the light emitting device 2 according to the present embodiment is provided with the first light emitter 3 and the second light emitter 4, and the first light emitter 3 is provided with the first light source 31, the first collimator 32 and the first lens 33, wherein the first light source 31 emits the light, the first collimator 32 substantially collimates the light emitted from the first light source 31 with respect to the first optical axis 3A, and the first lens 33 is provided with the plurality of first small lenses 330 to make the first light E1 emitted from the first collimator 32 wide-angle with respect to the right-left direction X as the first direction different from the first optical axis 3A. Further, the second light emitter 4 is provided with the second light source 41, the second collimator 42 and the second lens 43, wherein the second light source 41 emits the light, the second collimator 42 substantially collimates the light emitted from the second light source 41 with respect to the second optical axis 4A, and the second lens 43 is provided with the plurality of second small lenses 430 to make the second light E2 emitted from the second collimator 42 wide-angle with respect to the right-left direction X as the first direction different from the second optical axis 4A. The first small lenses 330 each have a shape in which the maximum value θmax of the angle formed between the first incident plane 33N provided with the first small lenses 330 and the tangent of the first small lens 330 is larger than the angle θ0 formed between the first incident plane 33N and the first light E1, and substantially the same shape is also provided to each of the second small lenses 430. Specifically, the second small lenses 430 each have the shape in which the maximum value of the angle formed between the second incident plane 43N and the tangent of the second small lens 430 is larger than the angle formed between the second incident plane 43N and the second light E2.

In the first lens 33 in the present embodiment, the first small lenses 330 provided to the first incident plane 33N each have the shape described above, and as a result, there is formed the shape in which the junction 335 between the first small lenses 330 adjacent to each other is recessed with respect to the first tangent F1 extending in the same direction as that of the first light E1. Therefore, since there is no chance for the first light E1 to enter the junction 335 between the first small lenses 330 adjacent to each other, it is possible for the first lens 33 to reduce the diffraction noise due to the fact that the light enters the round corner part of the lens. Thus, it is possible to reduce the interference pattern by randomizing the first small lenses 330 in size, and at the same time, it is possible to suppress an increase in the diffraction noise due to the randomization. Therefore, there is realized the first lens 33 capable of emitting the light having the interference pattern and the diffraction noise reduced. Further, it is possible for the second lens 43 to emit the light having the interference pattern and the diffraction noise reduced in substantially the same manner.

In the present embodiment, by using the first lens 33 and the second lens 43 described above, the light emitting device 2 capable of emitting the light having the interference pattern and the diffraction noise reduced is realized. Thus, it is possible for the image display system 100 according to the present embodiment to increase the detection accuracy when detecting the position of the pointing body based on the reflected light RL from the pointing body such as the pen 10. Further, it is possible to increase the area where the pointing body can be detected.

The first small lenses 330 in the present embodiment each have a shape in which the angle formed between the first incident plane 33N and the tangent of the first small lens 330 is larger than the angle θ0 formed between the first incident plane 33N and the first light E1 in the first area 334a which is the area at the junction 335 side with respect to the first tangent point C1 as the tangent point with the first tangent F1 extending in the incident direction of the first light E1. Thus, there is formed the shape in which the entire area of the first area 334a and the junction 335 is recessed with respect to the first tangent F1, and there is no chance for the first light E1 to enter the junction 335. Therefore, it is possible to emit the light having the interference pattern and the diffraction noise reduced from the first light emitter 3. Further, since the second small lenses 430 each have substantially the same shape, it is possible to emit the light having the interference pattern ant the diffraction noise reduced from the second light emitter 4.

In the present embodiment, the first optical axis 3A and the second optical axis 4A cross each other in an anterior stage of the light path of each of the first lens 33 and the second lens 43. Therefore, it becomes possible for the light emitting device 2 to emit the light sufficient in light intensity in the area adjacent to the light emitting device 2, and therefore, it is possible for the light emitting device 2 to emit the light having the light intensity enough for detecting the pointing body also in the area adjacent to the light emitting device 2 in the projection surface SC even when the light emitting device 2 is installed in the vicinity of the projection surface SC.

In the present embodiment, the first light emitter 3 is provided with the lens array having the first small lenses 330 each formed of a Powell lens arranged in an array, and the second light emitter 4 is provided with the lens array having the second small lenses 430 each formed of a Powell lens arranged in an array. By arranging the Powell lenses in an array as described above, the light made wide-angle by the first small lenses 330 adjacent to each other is superimposed with each other, and the light made wide-angle by the second small lenses 430 adjacent to each other is superimposed with each other. Therefore, even when the deterioration in positional accuracy between the first light source 31 and the first lens 33 and the deterioration in positional accuracy between the second light source 41 and the second lens 43 occur, it is possible to suppress the eccentricity of the intensity distribution of the light in the direction along the projection surface SC. Therefore, it becomes possible to loosen the alignment accuracy between the first light source 31 and the first lens 33 and the alignment accuracy between the second light source 41 and the second lens 43.

In the present embodiment, the plurality of first small lenses 330 are randomized in size, and includes the first small lenses 330 of a plurality of sizes. Thus, it is possible to reduce the interference pattern occurring in the light emitted from the first small lenses 330. Further, the second small lenses 430 are also provided with substantially the same configuration, and the plurality of second small lenses 430 are randomized in size, and includes the second small lenses 430 of a plurality of sizes. Therefore, it is possible to reduce the interference pattern occurring in the light emitted from the second small lenses 430.

The light emitting device 2 according to the present embodiment is provided with the cover lens 22 having the curved surface shape and disposed downstream of the first lens 33 and the second lens 43. By providing the cover lens 22 with the curved surface shape, it is possible to decrease the incident angle of the light emitted from the first light emitter 3 or the second light emitter 4 when entering the cover lens 22. Therefore, it is possible to reduce the light loss due to the interfacial reflection.

In the present embodiment, the cover lens 22 is supported so as to be able to rotate around the first axis L as the rotational axis line substantially parallel to the right-left direction X. Thus, it is possible to adjust the installation angle of the cover lens 22 to the appropriate angle.

Modified Example 1

Figure 10:
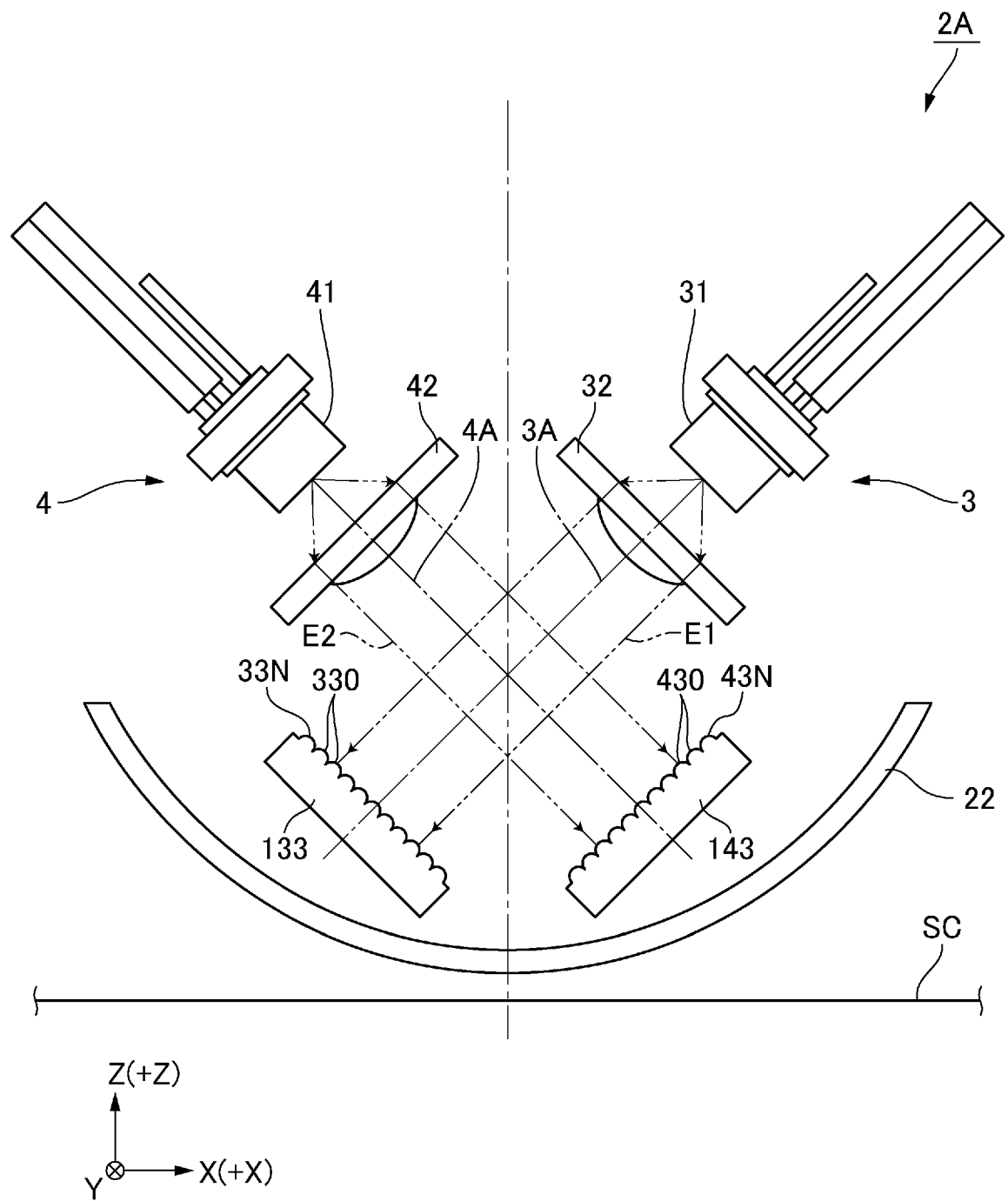
FIG. 10 is a schematic diagram showing a schematic configuration of a light emitting device according to Modified Example 1.

FIG. 10 is a schematic diagram showing a schematic configuration of a light emitting device 2A according to Modified Example 1. The light emitting device 2A according to Modified Example 1 has substantially the same configuration as in the embodiment described above except the point that a first lens 133 and a second lens 143 are not provided in a single lens body, but are separate bodies. Further, the application to the image display system is also substantially the same as in the case of the embodiment described above.

The first lens 133 in the Modified Example 1 is provided with the first incident plane 33N provided with the plurality of first small lenses 330, and the first small lenses 330 each have the shape in which the first light E1 does not enter the junction between the first small lenses 330 adjacent to each other similarly to the embodiment described above. Similarly, the second lens 143 is provided with the second incident plane 43N provided with the plurality of second small lenses 430, and the second small lenses 430 each have the shape in which the second light E2 does not enter the junction between the second small lenses 430 adjacent to each other similarly to the embodiment described above. Therefore, substantially the same functions and advantages as in the embodiment described above can be obtained.

Modified Example 2

Figure 11:
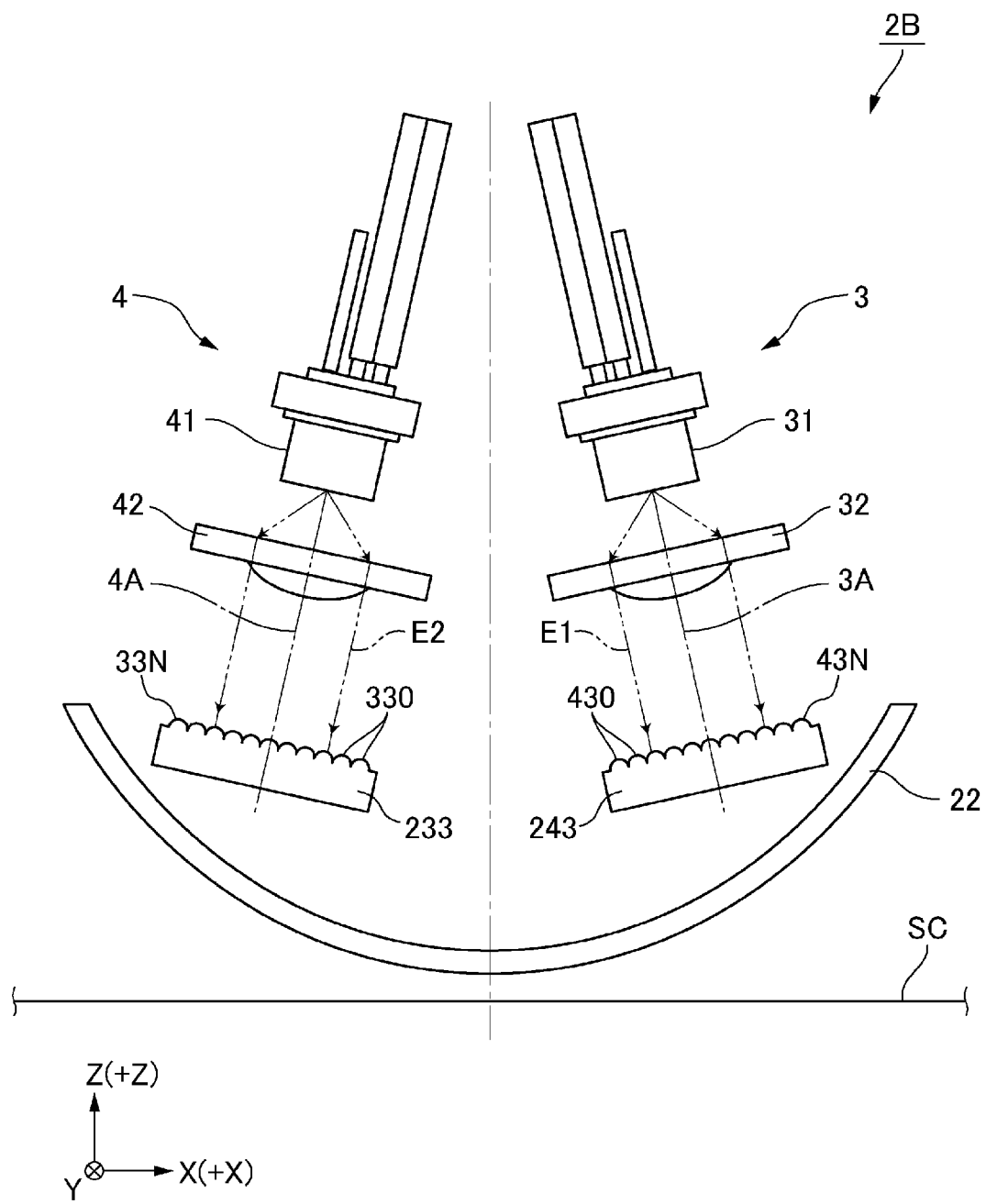
FIG. 11 is a schematic diagram showing a schematic configuration of a light emitting device according to Modified Example 2.

FIG. 11 is a schematic diagram showing a schematic configuration of a light emitting device 2B according to Modified Example 2. In the light emitting device 2B according to Modified Example 2, a first lens 233 and a second lens 243 are not provided in a single lens body, but are separate bodies similarly to Modified Example 1. Further, the first light emitter 3 and the second light emitter 4 are configured so that the first optical axis 3A does not cross the second optical axis 4A on the optical path between the first collimator 32 and the second lens 243 when viewed from the front-back direction Y. The light emitting device 2B according to Modified Example 2 has substantially the same configuration as in the embodiment described above except the two points described above. Further, the application to the image display system is also substantially the same as in the case of the embodiment described above.

The first lens 233 in the Modified Example 2 is provided with the first incident plane 33N provided with the plurality of first small lenses 330, and the first small lenses 330 each have the shape in which the second light E2 does not enter the junction between the first small lenses 330 adjacent to each other similarly to the embodiment described above. Similarly, the second lens 243 is provided with the second incident plane 43N provided with the plurality of second small lenses 430, and the second small lenses 430 each have the shape in which the first light E1 does not enter the junction between the second small lenses 430 adjacent to each other similarly to the embodiment described above. Therefore, substantially the same functions and advantages as in the embodiment described above can be obtained. Further, since it is unnecessary to cross the optical path of the first light emitter 3 and the optical path of the second light emitter 4, the design freedom of the first light emitter 3 and the second light emitter 4 increases.

OTHER EMBODIMENTS

The present disclosure is not limited to the embodiment and modified examples described above, but can be implemented in a variety of aspects within the scope or the spirit of the present disclosure. For example, although the image display system 100 according to the embodiment described above is a system for projecting the image light GL on the projection surface SC with the projector 1, it is sufficient for the projection surface SC to be a display surface for displaying an image. For example, it is also possible to adopt a configuration of covering the display surface such as a liquid crystal display or an organic EL display with the light curtain formed by the light emitting device.

What is claimed is:

1. A light emitting device comprising:
a first light source;
a first collimator configured to substantially collimate first light emitted from the first light source with respect to a first optical axis;
a first lens including a plurality of first small lenses configured to make the first light emitted from the first collimator wide-angle with respect to a first direction different from the first optical axis;
a second light source;
a second collimator configured to substantially collimate second light emitted from the second light source with respect to a second optical axis; and
a second lens including a plurality of second small lenses configured to make the second light emitted from the second collimator wide-angle with respect to the first direction different from the second optical axis, wherein
the first lens and the second lens each include a light incident surface on which light is incident and a light exit surface which light exits,
the plurality of first small lenses is arranged on the light incident surface of the first lens,
the plurality of second small lenses is arranged on the light incident surface of the second lens,
the first small lens has a shape in which a maximum value of an angle formed between a first incident plane of the first lens and a tangent of the first small lens is larger than an angle formed between the first incident plane of the first lens and the first optical axis of the first light in an area at a junction side between the first small lenses with respect to a tangent point with the tangent of the first small lens extending in a same direction as a direction of the first light, and
the second small lens has a shape in which a maximum value of an angle formed between a second incident plane of the second lens and a tangent of the second small lens is larger than an angle formed between the second incident plane of the second lens and the second optical axis of the second light.

2. The light emitting device according to claim 1, wherein the second small lens has a shape in which the angle formed between the second incident plane and the tangent of the second small lens is larger than the angle formed between the second incident plane and the second light in an area at a junction side between the second small lenses with respect to a tangent point with the tangent of the second small lens extending in a same direction as a direction of the second light.

3. An image display system comprising:
the light emitting device according to claim 2;
an imager configured to detect a reflection position of light emitted from the light emitting device;
a projection surface; and
a projection device configured to project an image corresponding to a detection result detected by the imager on the projection surface.

4. The light emitting device according to claim 1, wherein the first optical axis crosses the second optical axis on an optical path between the first collimator and the first lens when viewed from a direction perpendicular to a plane including the first optical axis and the second optical axis.

5. An image display system comprising:
the light emitting device according to claim 4;
an imager configured to detect a reflection position of light emitted from the light emitting device;
a projection surface; and
a projection device configured to project an image corresponding to a detection result detected by the imager on the projection surface.

6. The light emitting device according to claim 1, wherein the first optical axis does not cross the second optical axis on an optical path between the first collimator and the first lens when viewed from a direction perpendicular to a plane including the first optical axis and the second optical axis.

7. An image display system comprising:
the light emitting device according to claim 6;
an imager configured to detect a reflection position of light emitted from the light emitting device;
a projection surface; and
a projection device configured to project an image corresponding to a detection result detected by the imager on the projection surface.

8. The light emitting device according to claim 1, wherein the first small lens is a Powell lens.

9. An image display system comprising:
the light emitting device according to claim 8,
an imager configured to detect a reflection position of light emitted from the light emitting device;
a projection surface; and
a projection device configured to project an image corresponding to a detection result detected by the imager on the projection surface.

10. The light emitting device according to claim 1, wherein the second small lens is a Powell lens.

11. The light emitting device according to claim 1, wherein the plurality of first small lenses provided to the first lens includes the first small lenses of a plurality of sizes.

12. The light emitting device according to claim 1, wherein the plurality of second small lenses provided to the second lens includes the second small lenses of a plurality of sizes.

13. The light emitting device according to claim 1, further comprising:
a cover lens having a curved surface shape and disposed downstream of the first lens.

14. An image display system comprising:
the light emitting device according to claim 1;
an imager configured to detect a reflection position of light emitted from the light emitting device;
a projection surface; and
a projection device configured to project an image corresponding to a detection result detected by the imager on the projection surface.

15. A light emitting device comprising:
a first light source;
a first collimator configured to substantially collimate first light emitted from the first light source with respect to a first optical axis;
a first lens including a plurality of first small lenses configured to make the first light emitted from the first collimator wide-angle with respect to a first direction different from the first optical axis;
a second light source,
a second collimator configured to substantially collimate second light emitted from the second light source with respect to a second optical axis;
a second lens including a plurality of second small lenses configured to make the second light emitted from the second collimator wide-angle with respect to the first direction different from the second optical axis; and
a cover lens having a curved surface shape and disposed downstream of the first lens, wherein
the first lens and the second lens each include a light incident surface on which light is incident and a light exit surface which light exits,
the plurality of first small lenses is arranged on the light incident surface of the first lens,
the plurality of second small lenses is arranged on the light incident surface of the second lens,
the first small lens has a shape in which a maximum value of an angle formed between a first incident plane of the first lens and a tangent of the first small lens is larger than an angle formed between the first incident plane of the first lens and the first optical axis of the first light,
the second small lens has a shape in which a maximum value of an angle formed between a second incident plane of the second lens and a tangent of the second small lens is larger than an angle formed between the second incident plane of the second lens and the second optical axis of the second light, and
the cover lens rotates around a rotational axis line substantially parallel to the first direction.

16. A lens comprising:
a light incident surface on which light is incident;
a light exit surface which light exits; and
a plurality of small lenses arranged on the light incident surface, the small lenses being configured to make first light entering the lens wide-angle with respect to a first direction different from an incident direction of the first light, wherein
the small lens has a shape in which a maximum value of an angle formed between an incident plane of the lens and a tangent of the small lens is larger than an angle formed between the incident plane of the lens and a first optical axis of the first light in an area at a junction side between the small lenses with respect to a tangent point with the tangent of the small lens extending in a same direction as a direction of the first light.

17. The lens according to claim 16, wherein the small lens is a Powell lens.

\* \* \* \* \*